(12) United States Patent
Hui et al.

(10) Patent No.: US 11,082,318 B2
(45) Date of Patent: *Aug. 3, 2021

(54) NETWORK INTERFACE CONTROLLER

(71) Applicant: Shanghai Zhaoxin Semiconductor Co., Ltd., Shanghai (CN)

(72) Inventors: Zhiqiang Hui, Beijing (CN); Jingyang Wang, Beijing (CN); Wei Shao, Shanghai (CN)

(73) Assignee: Shanghai Zhaoxin Semiconductor Co., Ltd., Shanghai (CN)

( * ) Notice: Subject to any disclaimer, the term of this patent is extended or adjusted under 35 U.S.C. 154(b) by 204 days.

This patent is subject to a terminal disclaimer.

(21) Appl. No.: 16/159,719

(22) Filed: Oct. 15, 2018

(65) Prior Publication Data
US 2019/0306002 A1 Oct. 3, 2019

(30) Foreign Application Priority Data

Mar. 27, 2018 (CN) .......................... 201810258193.9
Mar. 30, 2018 (CN) .......................... 201810295222.9
Mar. 30, 2018 (CN) .......................... 201810298515.2

(51) Int. Cl.
| H04L 1/00 | (2006.01) |
| H04L 12/26 | (2006.01) |
| H04L 29/06 | (2006.01) |
| H04L 29/12 | (2006.01) |
| H04L 12/02 | (2006.01) |
| H04L 12/70 | (2013.01) |

(52) U.S. Cl.
CPC .......... *H04L 43/0847* (2013.01); *H04L 12/02* (2013.01); *H04L 29/06* (2013.01); *H04L 61/103* (2013.01); *H04L 61/6009* (2013.01); *H04L 69/166* (2013.01); *H04L 69/22* (2013.01); *H04L 61/6022* (2013.01); *H04L 2012/5614* (2013.01)

(58) Field of Classification Search
None
See application file for complete search history.

(56) References Cited

U.S. PATENT DOCUMENTS

| 6,836,469 B1 * | 12/2004 | Wu | H04W 74/0866 370/230 |
| 7,219,294 B2 * | 5/2007 | Vogt | G06F 11/1004 714/758 |
| 2004/0008631 A1 * | 1/2004 | Kim | H04L 1/0057 370/242 |
| 2017/0308303 A1 * | 10/2017 | Sterns | G06F 3/0689 |

* cited by examiner

*Primary Examiner* — Mujtaba M Chaudry
(74) *Attorney, Agent, or Firm* — JCIPRNET

(57) ABSTRACT

A network interface controller including a data alignment module, a boundary determination module and a checksum module is provided. The data alignment module receives raw data and re-combines the raw data as first valid data, wherein the raw data includes a first layer protocol segment and a second layer protocol segment. The boundary determination module receives the raw data in parallel to the data alignment module and performs a boundary determination operation on the raw data to generate a boundary information indicating a boundary between the first layer protocol segment and the second layer protocol segment. The checksum module is coupled to the data alignment module and configured to disassemble the first valid data as second valid data and calculate a checksum according to the boundary information and the second valid data.

20 Claims, 9 Drawing Sheets

NETWORK INTERFACE CONTROLLER

CROSS-REFERENCE TO RELATED APPLICATION

This application claims the priority benefit of China application serial no. 201810295222.9, filed on Mar. 30, 2018, China application serial no. 201810298515.2, filed on Mar. 30, 2018, and China application serial no. 201810258193.9, filed on Mar. 27, 2018. The entirety of each of the above-mentioned patent applications is hereby incorporated by reference herein and made a part of this specification.

BACKGROUND OF THE DISCLOSURE

Field of the Disclosure

The disclosure is related to a network interface controller, and particularly to a network interface controller capable of performing boundary determination operation in advance.

Description of Related Art

Referring to FIG. 1, which is a schematic view of hardware in a conventional host. As shown in FIG. 1, a conventional host may include a central processing unit (CPU), a north bridge (NB), a dynamic random access memory (DRAM) and a south bridge (SB), wherein the NB and SB may be integrated in the same chipset. The SB may include hardware such as a universal serial bus (USB) and a network interface controller (NIC) and the like. The NIC may acquire required data from DRAM, NB or CPU and perform processing operation thereon.

Taking FIG. 2 as an example, FIG. 2 is a schematic view of a NIC and a related transmission interface. As shown in FIG. 2, the NIC may include a core module and a suspend module and is capable of processing an upper layer data and transmitting the processed data from a transmitter bus (i.e., TX bus) to another host through a PAD module and a physical layer (PHY) module. The upper layer data may be obtained from other hardware, such as DRAM, NB or CPU, of a host embedded with NIC.

In order to improve the reliability of transmitted data, typically a checksum segment is present in the transmitted data such that both of the transmitter and receiver can verify the accuracy of the transmitted data. Since it is required to generate checksum before every data packet is transmitted, if the checksum calculating efficiency can be improved, the transmitting efficiency of the data packet may be enhanced as well.

SUMMARY OF THE DISCLOSURE

In view of the above, the disclosure provides a network interface controller capable of performing boundary determination operation in advance when checksum of data is calculated, thereby accelerating calculating process of checksum and improving efficiency.

The disclosure provides a network interface controller including a data alignment module, a boundary determination module and a checksum module. The data alignment module receives at least one raw data and re-combines the raw data as a first valid data, wherein the raw data includes a first layer protocol segment and a second layer protocol segment. The boundary determination module receives the raw data in parallel to the data alignment module and performs a boundary determination operation according to the raw data to generate a boundary information, wherein the boundary information indicates a boundary between the first layer protocol segment and the second layer protocol segment. The checksum module is coupled to the data alignment module and configured to disassemble the first valid data as at least one second valid data, and calculate a checksum according to the boundary information and the second valid data.

Based on the above, the network interface controller provided by the disclosure can perform the boundary determination operation in advance according to the raw data (including invalid data) to generate the boundary information through the boundary determination module without having to wait for the first valid data to be disassembled as the second valid data, and then perform the boundary determination operation to the second valid data, thereby shortening the time required for calculating checksum and improving efficiency.

In order to make the aforementioned features and advantages of the disclosure more comprehensible, embodiments accompanying figures are described in detail below.

DESCRIPTION OF EMBODIMENTS

Figure 1:
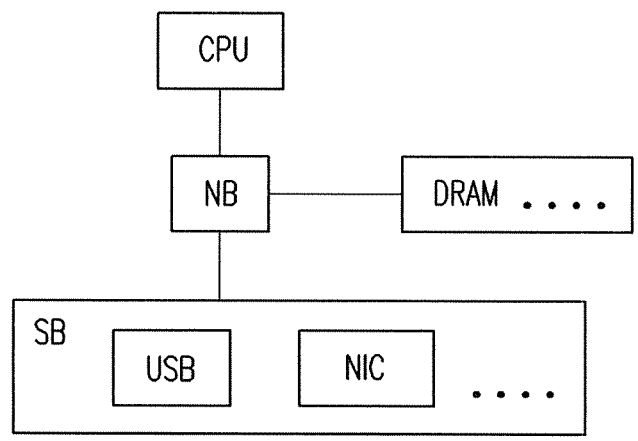
FIG. 1 is a schematic view of hardware in a conventional host.
Figure 2:
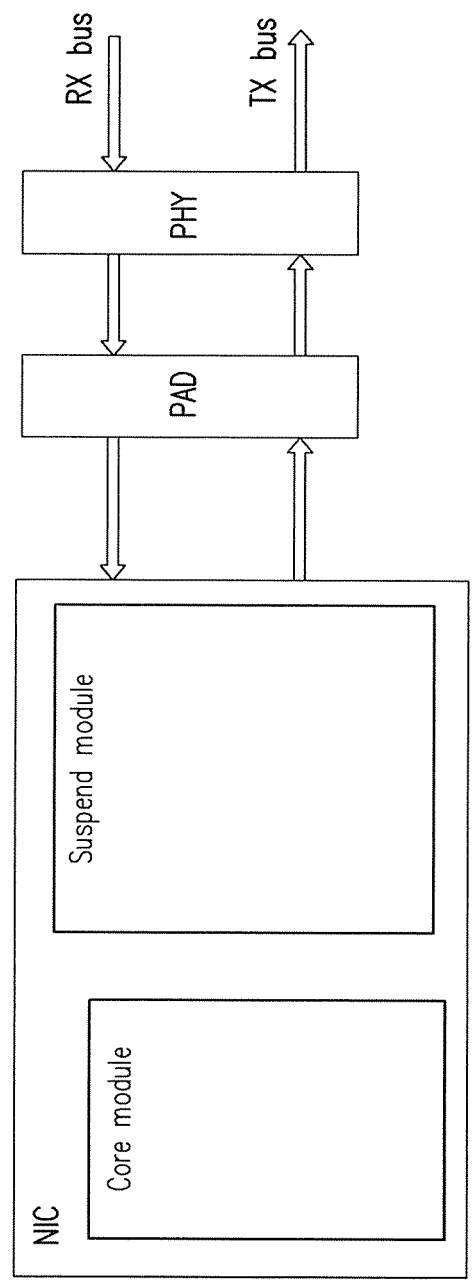
FIG. 2 is schematic view of a NIC and a related transmission interface.
Figure 3A:
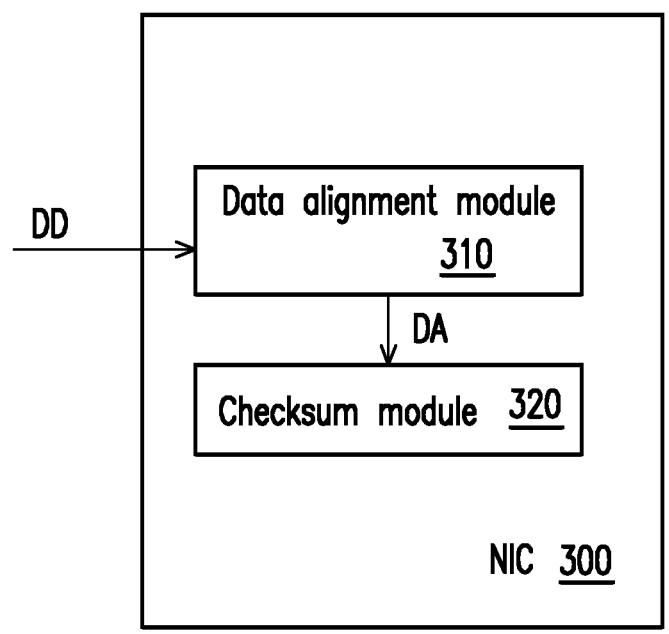
FIG. 3A is a schematic view of a NIC according to an embodiment of the disclosure.
Figure 3B:
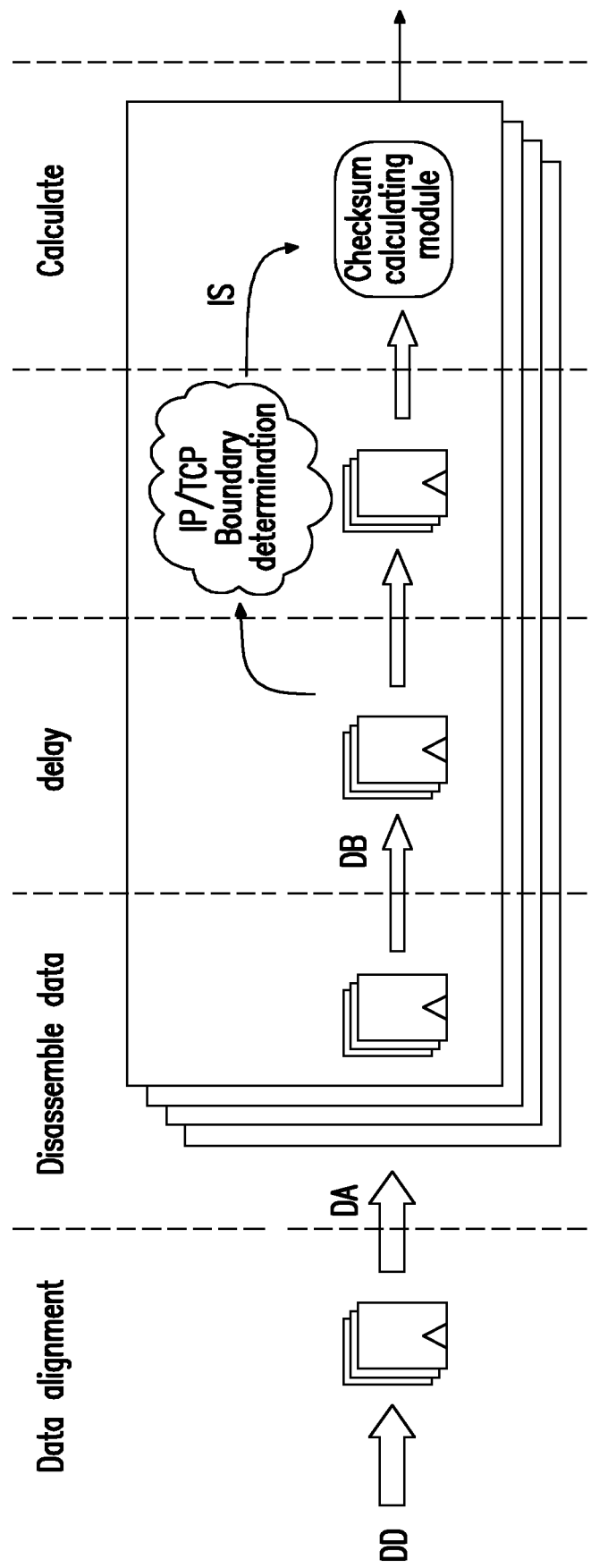
FIG. 3B is a schematic view showing operation of the NIC in FIG. 3A.

Referring to FIG. 3A and FIG. 3B, FIG. 3A is a schematic view of a NIC according to an embodiment of the disclosure, and FIG. 3B is schematic view of operation of the NIC in FIG. 3A. As shown in FIG. 3A, a NIC 300 includes a data alignment module 310 and a checksum module 320. In one embodiment, the data alignment module 310 and the checksum module 320 may be disposed in a core module shown in FIG. 2. In one embodiment, the core module in FIG. 2 may include one or more transmitters (TX), and the data alignment module 310 and the checksum module 320 may be disposed in respective TX of the core module to work with each other and perform the required checksum calculation when a data packet is received. In some embodiments, the network interface controller may be integrated in one chipset or may be embedded in a host, wherein the host may refer to an electronic apparatus such as a notebook computer capable of performing network communication. In one embodiment, the NIC 300 may be a network interface card (or typically referred to as "network card"). More specifically, the NIC 300 may be a gigabit network interface card (GNIC), which should not be construed as a limitation to the disclosure. More details are provided below with reference to FIG. 3B.

Referring to FIG. 3B, when the data alignment module 310 obtains raw data DD from other hardware modules (e.g., DRAM, CPU or NB, etc.) of the host, since the raw data DD typically includes valid data and invalid data, the data alignment module 310 may re-combine the valid data in the raw data DD as a first valid data DA.

For example, assuming that the first raw data and the second raw data respectively obtained from the interface (64-bit in width) of the host are "55aa_55aa_55aa_5500" and "5507_0605_0403_0201", the valid data of the first raw data and the second raw data are "00" and "07_0605_0403_0201" respectively, in such case, the data alignment module 310 may re-combine the valid data as the first valid data "0706_0605_0302_0100" (64-bit in width, i.e., eight bytes).

In the embodiment, the raw data DD may be from a specific packet, and the specific packet may have different formats according to the communication protocol used by the NIC 300. For example, the specific packet may be data transmitted according to multiple-layer protocol, the multiple-layer protocol may include physical layer, network layer and/or transport layer. Specifically, the network layer protocol may include Internet protocol (IP), the transport layer protocol may include transmission control protocol (TCP) and user datagram protocol (UDP).

In one embodiment, the specific packet may at least include a first layer protocol segment and a second layer protocol segment, and the second layer protocol segment may be included in the payload of the first layer protocol. That is, the second layer protocol is the upper layer protocol of the first layer protocol. For example, the first layer protocol may be Internet protocol (IP) such as IP version 4 (IPV4) or IP version 6 (IPV6). Additionally, the second layer protocol may be transmission control protocol (TCP) or user datagram protocol (UDP). Corresponding to the two types of transmitting methods, namely IP+TCP and IP+UDP, the corresponding packets also have different formats, and the two formats shown in Table 1 and Table 2 below are examples.

TABLE 1

| (IPV6 + TCP) | | | | | | | |
|---|---|---|---|---|---|---|---|
| B0 | B1 | B2 | B3 | B4 | B5 | B6 | B7 |
| | | DA | | | | SA | |
| | SA | | Type/Length | | | Ver | TC FL |
| FL | Payload Length | | NxtHeader | HopLimit | | Source IP Ad | |
| | | Source IP Ad | | | | | |
| | | Source IP Ad | | | | Des IP Ad | |
| | | Des IP Ad | | | | | |
| | | Des IP Ad | | | | TCP Source Port | |
| TCP Des Port | | Seq Num | | | | ACK num | |
| ACK num | HL/R/CODE Bit | | Window | | | TCP ChkSum | |
| Urgn Pointer | | | TCP payload | | | | |
| | | TCP payload | | | | | |

TABLE 2

| (IPV6 + UDP) | | | | | | | |
|---|---|---|---|---|---|---|---|
| B0 | B1 | B2 | B3 | B4 | B5 | B6 | B7 |
| | | DA | | | | SA | |
| | SA | | Type/Length | | | Ver | TC FL |
| FL | Payload Length | | NxtHeader | HopLimit | | Source IP Ad | |
| | | Source IP Ad | | | | | |
| | | Source IP Ad | | | | Des IP Ad | |
| | | Des IP Ad | | | | | |
| | Des IP Ad | | | | UDP Source Port | | |
| UDP Des Port | | MesLen | | UDP ChkSum | | UDP payload | |
| | | UDP payload | | | | | |

As shown above, Table 1 and Table 2 respectively exemplify packet formats of "IPV6+TCP" and "IPV6+UDP" in the absence of extension header, and the meaning of each segment may be referred to IEEE 802.3 specification, and original text is retained in the table for easy reference. Specific meaning of respective segment is not incorporated herein.

As shown in Table 1, Table 1 includes segments of a first layer protocol (i.e., IP) and segments of a second layer protocol (i.e., TCP), wherein the TCP segment is included in the payload of IP. Similarly, Table 2 also includes segments of the first layer protocol (i.e., IP) and segments of the second layer protocol (i.e., UDP), wherein the UDP segment is included in the payload of IP. For ease of description, TCP is described below as example of the second layer protocol, and persons skilled in the art should be able to correspondingly infer the embodiment using UDP as the second layer protocol based on the teaching below.

After the data alignment module 310 re-combines the valid data in the raw data DD as the first valid data DA, the checksum module 320 may disassemble the first valid data DA as the second valid data DB, wherein the length of each of the second valid data DB is smaller than the length of each of the first valid data DA. In one embodiment, assuming that the length of the first valid data DA is 64-bit in width, the first valid data DA can be disassembled as four groups of second valid data DB that is 16-bit width (e.g., two bytes). Typically, since the calculation of checksum is accumulated based on a unit of two bytes, the operation of disassembling the first valid data DA as the second valid data DB may facilitate the subsequent calculation of the checksum. The calculation of the checksum includes calculating the checksum of the second layer protocol (i.e., TCP/UDP) segment and calculating the checksum of pseudo header.

In one embodiment, the checksum module 320 may perform checksum calculation based on the pseudo header format shown in Table 3 below.

TABLE 3

(pseudo header)

Source IP Address
Destination IP Address
Length of Upper layer Protocol Segment
Zero                Next header according to the segment length of TCP, and begin to calculate the checksum of the segment of TCP (second layer protocol) from the boundary.

In another embodiment, assuming that the checksum module 320 perform calculation on the packet format of "IPV6+TCP" having one or more extension headers (see Table 4 below), the checksum module 320 may deduct the length of respective extension header from the payload length of IP to calculate the segment length of TCP.

TABLE 4

| B0 | B1 | B2 | B3 | B4 | B5 | B6 | B7 |
|---|---|---|---|---|---|---|---|
| | | DA | | | | SA | |
| | SA | | | Type/Length | | Ver | TC | FL |
| FL | | Payload Length | NxtHeader | HopLimit | | Source IP Ad | |
| | | | | Source IP Ad | | | |
| | | Source IP Ad | | | | Des IP Ad | |
| | | | | Des IP Ad | | | |
| | | Des IP Ad | | | | Next header | Hdr ext len |
| | | | | Options | | | |
| | | Options | | | | Next header | Hdr ext len |
| | | | | Options | | | |
| | | | | Options | | TCP Source Port | |
| | TCP Des Port | | | | Seq Num | | ACK num |
| | ACK num | | HL/R/CODE Bit | | Window | | TCP ChkSum |
| Urgn Pointer | | | | | | TCP payload | |
| | | | | TCP payload | | | |

For example, assuming that the IP segment in Table 1 is taken into consideration, the checksum module 320 may respectively fill in the content of the second valid data DB corresponding to segments such as "Source IP Ad", "Des IP Ad" and "NxtHeader" in Table 1 into "Source IP Address", "Destination IP Address" and "Next header" in Table 3. Next, the checksum module 320 may calculate the result of "length of upper layer protocol segment" and then fill it into the corresponding segment of Table 3 to calculate the checksum of the pseudo header. In different embodiments, since the boundary between the IP segment and the TCP segment can be derived by calculating the "length of upper layer protocol segment", the checksum of the second layer protocol (i.e., TCP/UDP) segment may be calculated as well. Details are provided below.

In an embodiment, assuming that the checksum module 320 performs calculation on the packet format of "IPV6+TCP", wherein the packet format of "IPV6+TCP" does not include extension header, then "length of upper layer protocol segment" may be derived from Table 1 and directly obtained from the second valid data DB. Specifically, in the absence of the extension header, the payload length of IP is the segment length of TCP (i.e., upper layer protocol of IP), and the checksum module 320 may directly obtain the payload length of IP from the segment in the second valid data DB corresponding to "Payload Length" of Table 1, and fill the payload length of IP into the "length of upper layer protocol segment" in Table 3 to facilitate subsequent calculation of the checksum of pseudo header. That is, the checksum module 320 may directly use the payload length of IP as the segment length of TCP. Additionally, the boundary between the IP (first layer protocol) segment and the TCP (second layer protocol) segment can be obtained Referring to Table 4, Table 4 is an exemplary packet format including two extension headers "IPV6+TCP". Similar to the previous embodiments, the meaning of respective segment in FIG. 4 may be derived from IEEE 802.3 specification, and thus no repetition is incorporated herein.

In the example of Table 4, the checksum module 320 may derive the payload length of IP from the segment in the second valid data DB corresponding to "Payload Length" in Table 4, and deduct the length of respective extension header to calculate the segment length of TCP. The details in this regard may be referred to IEEE 802.3 specification, and thus no repetition is incorporated herein.

After calculating the result of "length of upper layer protocol segment" based on the above teaching, the checksum module 320 may correspondingly fill the result of "length of upper layer protocol segment" into Table 3 and generate a control information IS to instruct the checksum calculating module to start performing checksum calculation on the subsequent of TCP (second layer protocol) segment and the suffix pseudo header from the boundary between the segment of IP (first layer protocol) and the segment of TCP (second layer protocol).

In one embodiment, the calculation of checksum exemplarily includes: (1) initialization of checksum segment, first of all, an initial value is provided to "TCP ChkSum" (16 bits) in Table 1, and the value is all set as 0; (2) all of the content that is to undergo checksum calculation is divided into groups based on a unit of 16 bits (i.e., two bytes); (3) the calculation process is to perform cycle carry additions on the 16-bit binary numbers and if there is a carry out of the most significant bit after additions, this carry will be carried to the least significant bit (1's complement sum); (4) after accumulation, a complementary operation is then performed on the accumulation result to acquire the checksum.

Thereafter, the checksum module 320 may fill the obtained checksum into a checksum segment. For example, when the format of the packet is "IPV6+TCP", the obtained checksum is filled into the "TCP ChkSum" segment before the whole "IPV6+TCP" packet is transmitted. When the format of the packet is "IPV6+UDP", the obtained checksum is filled into the "UDP ChkSum" segment before the whole "IPV6+UDP" packet is transmitted. In one embodiment, the "IPV6+TCP" packet and/or "IPV6+UDP" packet may be transmitted from the transmitter TX to a receiver (RX) of other host through a transmitter bus (TX bus).

It should be noted that it is required in the boundary determination operation to complete retrieving of the segment in the second valid data DB corresponding to "Nxt-Header" in Table 1 ("NxtHeader" segment may be directly separated according to the second valid data DB without delaying) and accumulating the length thereof, and it requires at least two cycles of delay to complete accumulating and retrieving the boundary between IP and TCP. Moreover, if there exists extension header, it requires one cycle to input the retrieved information into the related calculation logic, and it takes another one cycle to calculate the length of extension header according to the "Next header" segment of respective extension header. That is, the more the number of extension header, the more the cycle needs to be delayed.

Figure 4:
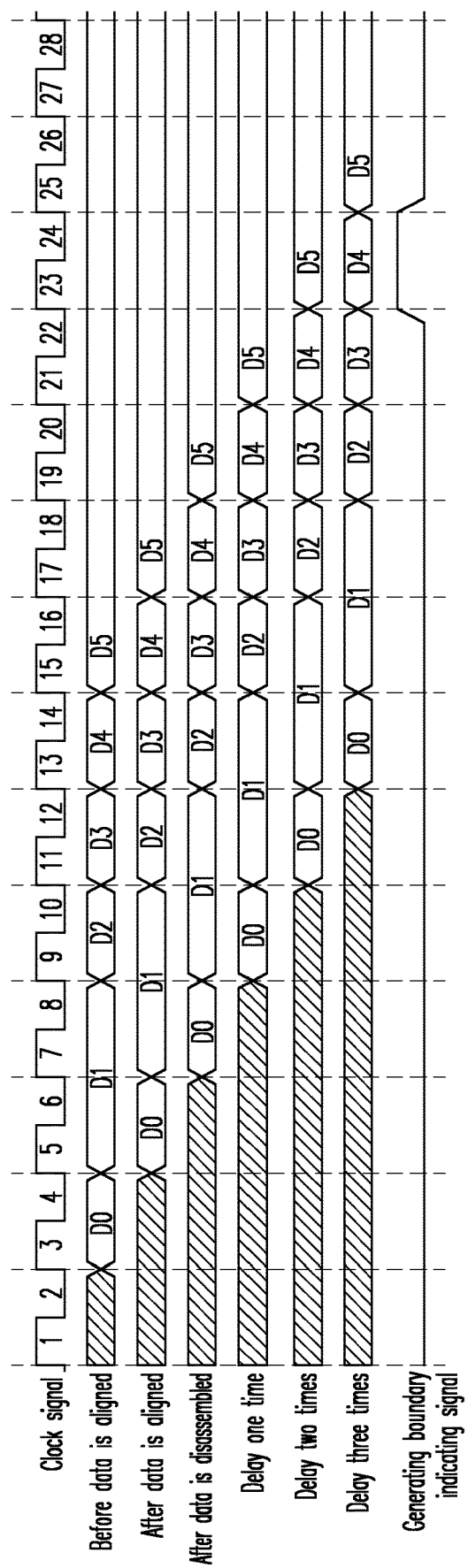
FIG. 4 is a timing diagram illustrated according to FIG. 3A and FIG. 3B.

Referring to FIG. 4, FIG. 4 is a timing diagram illustrated according to FIG. 3A and FIG. 3B. In FIG. 4, assuming that data D0, D1, D2, D3 and D4 are different data in IP segment of "IPV6+TCP" packet, the data D4 is followed by TCP segment (e.g., data D5 as shown in FIG. 4), and "IPV6+TCP" packet includes three extension headers. As shown in FIG. 4, the aligning operation is performed to the data at the second cycle, and the control information IS is generated at the twelfth cycle (i.e., $24^{th}$ clock). It should be noted that the clock cycle occupied by the packet shown in FIG. 4 is illustrated for exemplary purpose. In actual circumstances, the packet may occupy more clock cycles, for example, the data D4 may occupy two cycles.

It should be noted that FIG. 3B shows that the IP/TCP boundary determination operation is performed according to the second valid data DB (which is composed of valid data). However, in actual practice, when the boundary determination operation is performed, it only requires the "Payload Length" in Table 1 or other segments related to length in order to perform the operation, it is not necessary to obtain the data from the second valid data DB (which is disassembled from the first valid data DA) having a smaller bit width (16 bits). In other words, it is not necessary to perform the boundary determination operation after the generation of the second valid data DB, and the boundary determination operation may be performed directly according to the raw data. Additionally, the checksum calculation may be performed without having to wait for calculation of the "Payload Length" or determination of the boundary between the first layer protocol segment and the second layer protocol segment, and a portion of checksum calculation may begin according to the disassembled segment data after the segment data that is involved in checksum calculation is disassembled.

In view of the above, another embodiment of the disclosure provides a NIC capable of performing boundary determination operation while performing data alignment, and thus capable of generating control information more quickly, advancing the time for performing checksum calculation, such that the checksum can be calculated more quickly and then the packet may be transmitted in time. In this manner, the efficiency of the NIC to transmit packet may be improved. More details are provided below.

Figure 5A:
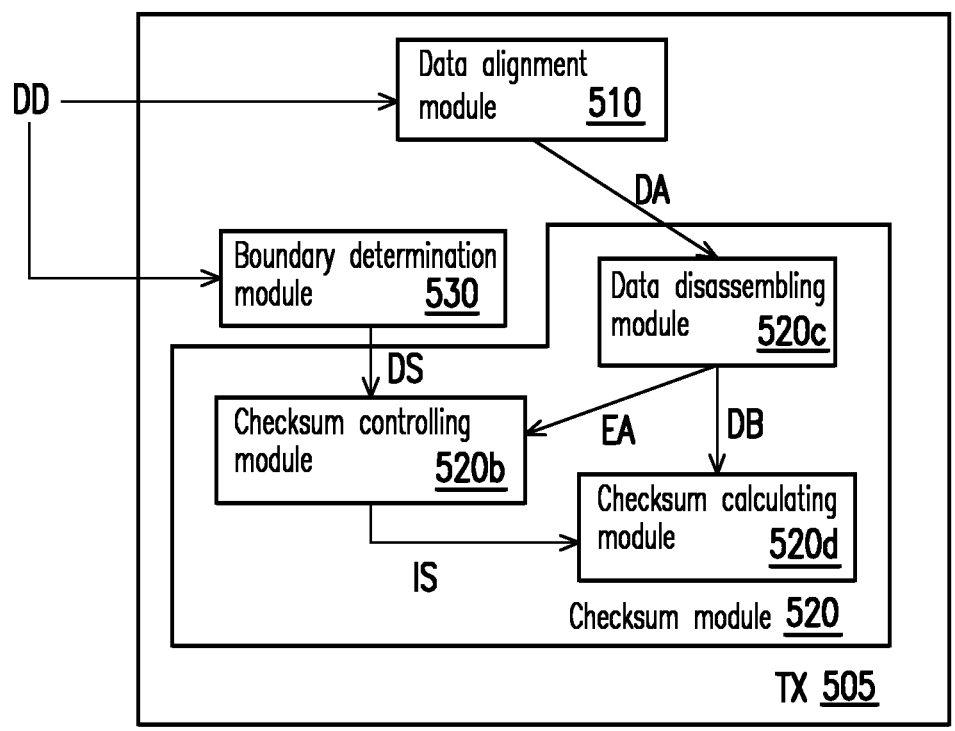
FIG. 5A is schematic view showing TX of a core module in a NIC according to an embodiment of the disclosure.
Figure 5B:
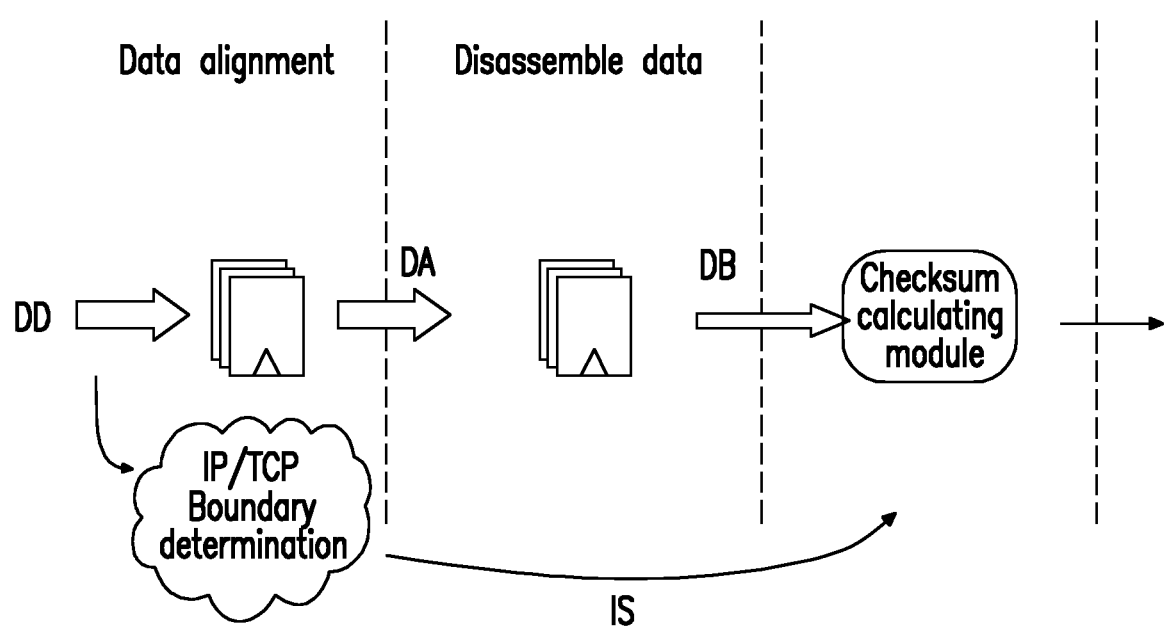
FIG. 5B is schematic view showing operation of the NIC in FIG. 5A.

Referring to FIG. 5A and FIG. 5B, FIG. 5A is schematic view showing TX of a core module in NIC according to an embodiment of the disclosure, and FIG. 5B is schematic view showing operation of the NIC in FIG. 5A. In the embodiment, TX 505 includes a data alignment module 510, a boundary determination module 530 and a checksum module 520. The data alignment module 510 receives at least one raw data DD, and re-combines the raw data DD as the first valid data DA, wherein the raw data DD includes a first layer protocol (IP) segment and a second layer protocol (TCP/UDP) segment. The boundary determination module 530 receives the raw data DD in parallel to the data alignment module 510 and preforms a boundary determination operation according to the raw data to generate a boundary information DS, wherein the boundary information DS indicates a boundary between the first layer protocol (IP) segment and the second layer protocol (TCP/UDP) segment. The checksum module 520 is coupled to the data alignment module 510 and configured to disassemble the first valid data DA as at least one second valid data DB, and calculate checksum according to the boundary information DS and the second valid data DB.

In one embodiment, the checksum module 520 may further include a checksum controlling module 520b, a data disassembling module 520c and a checksum calculating module 520d, which should not be construed as a limitation to the disclosure. For example, in one embodiment, the checksum controlling module 520b and the data disassembling module 520c in FIG. 5A may be integrated in one module, such as the module which disassembles data in FIG. 5B.

First of all, the data alignment module 510 may receive the raw data DD (which is 64-bit in width, for example), and re-combine the raw data DD as the first valid data DA (which is 64-bit in width, for example). Thereafter, the data alignment module 510 may provide the first valid data DA to the checksum module 520. In one embodiment, the data alignment module 510 may provide the first valid data DA to the data disassembling module 520c to facilitate the data disassembling module 520c to disassemble the first valid data DA as a plurality of second valid data DB (which is 16-bit width, for example). The details regarding the technical means described here may be derived from the description regarding the data alignment module 310 in the embodiment of FIG. 3A, which will not be repeated herein. Furthermore, the checksum controlling module 520b is configured to receive boundary information DS and generates control information IS according to the boundary information DS. The control information IS includes a control signal and a length (the length corresponds to "upper protocol segment length" segment subsequently filled into Table 3 when calculating the checksum of the pseudo header) of the first layer protocol (IP) segment. The checksum calculating module 520d is configured to calculate the checksum according to the control signal, the length of the first layer protocol (IP) segment and the second valid data DB.

Different from the embodiment of FIG. 3A, the boundary determination module 530 and the data alignment module 510 may receive the raw data DD including invalid data in parallel, and the boundary determination module 530 performs boundary determination operation according to the raw data DD. In one embodiment, the boundary determination module 530 removes the invalid data from the received raw data DD to generate a third valid data (which is 64-bit width, for example). Thereafter, the boundary determination module 530 may preform boundary determination operation according to the third valid data, and after the boundary determination operation is completed, generate a boundary information according to the result of the boundary determination operation, and transmit the boundary information DS to the checksum controlling module 520b to generate the control information IS, which should not be construed as a limitation to the disclosure. For example, the boundary determination module 530 may directly perform the boundary determination operation according to the raw data DD.

In one embodiment, the boundary determination module 530 may refer to Table 1 and directly retrieve the "Payload Length" segment from the third valid data to obtain the payload length of IP, for performing calculation of "length of upper layer protocol segment" in Table 3. Details in this regard may be derived from the previous embodiments, which will not be repeated herein.

In one embodiment, after the boundary determination module 530 completes the boundary determination operation, the boundary determination module 530 may generate the boundary information DS and provide the boundary information DS to the checksum controlling module 520b. The boundary determination module 530 performs the boundary determination operation by, for example, determining whether there is extension header in the raw data and the number of extension header (if there is extension header) as well as whether the second layer protocol in the raw data is TCP protocol or UPD protocol and generate the boundary information DS according to next header segment "Next header". Specifically, the boundary information DS may include the information indicating whether there is extension header in the raw data, the type of extension header and/or information regarding length of extension header, for example, if it is determined that the type of extension header is "destination options header" (DH) according to "Next header", the value pre-stored in the next segment "header extension length" segment (Ext Len) is the length information of DH, e.g., the value pre-stored in Ext Len segment may be 1.

Based on the above, it is shown that the boundary determination module 530 in the embodiment does not perform the boundary determination operation according to the second valid data DB with a smaller bit width (the bit width thereof is 16 bit, for example) but preform the boundary determination operation in advance directly according to the raw data DD (i.e., the third valid data with 64-bit in width, for example), which the invalid data is removed as shown in FIG. 5B.

Additionally, in the embodiment, after the data disassembling module 520c generates the second valid data DB, a counting information EA may be correspondingly generated and transmitted to the checksum controlling module 520b. Specifically, when the data disassembling module 520c generates the second valid data DB according to the first valid data DA, the data disassembling module 520c generates the counting information EA which represents the beginning of the second valid data. For example, the data disassembling module 520c outputs the second valid data with 16-bit width. When the data disassembling module 520c starts to output IP header of the first layer protocol in the second valid data (e.g., the data disassembling module 520c outputs the former 16 bits of the data structure shown in the Table 1, Table 2 and Table 4), the counting information EA is generated. Thereafter, the checksum controlling module 520b may generate the control information IS according to the counting information EA and the boundary information DS, and provide the control information IS to the checksum calculating module 520d to trigger the checksum calculating module 520d to correspondingly calculate the required checksum (for example, if the raw data is "IPV6+TCP" packet, the required checksum is the checksum of pseudo header+TCP header+TCP payload.)

In one embodiment, the control information IS generated by the checksum controlling module 520b includes a control signal and a length of the second layer protocol segment, wherein the length of the second layer protocol segment may be calculated by the checksum controlling module 520b according to the received boundary information DS. More specifically, the length of the second layer protocol segment may be obtained by deducting the length of respective extension header from the value in the "Payload Length" segment shown in Table 1. For example, if the type of the extension header is a DH, the boundary information DS includes DH length information, i.e., value in Ext Len segment, then the length of the DH extension header is Ext Len*8+8, wherein the control signal indicates that the second valid data DB reaches the boundary between the first layer protocol (IP) segment and the second layer protocol (TCP/UDP) segment and the control signal may be generated by the checksum controlling module 520b according to the counting information EA and the boundary information DS. Specifically, after the checksum controlling module 520b receives the counting information EA, it begins to generate the second valid data DB. When the beginning of the second valid data DB passes through a fixed length segment (e.g., DA, SA, Type/Length, Ver . . . until Des IP Ad in data structure of Table 1, Table 2 and Table 4, these are segments with fixed length) of the first layer protocol, and then passes through the segment with unfixed length (i.e., reach the boundary between the first and the second layer protocol segments) of the first layer protocol indicated by the boundary information DS, the control signal is generated for instructing the checksum calculating module 520d to start calculating the checksum of the second layer protocol (IP) segment.

Details regarding using the checksum calculating module 520d to calculate the checksum may be derived from the previous embodiments, but the disclosure is not limited thereto. For example, in one embodiment, the checksum calculating module 520d further includes a register for temporarily storing pseudo header checksum. The pseudo header checksum is obtained by performing accumulating calculation to the segment in pseudo header (as shown in Table 3). The pseudo header is obtained by reconstructing segments such as the source address segment (e.g., source IP address in Table 3) of the first layer protocol, the destination address segment (e.g., destination IP address in Table 3) of the first layer protocol and the length segment (e.g., length of upper layer protocol segment in Table 3) of the second layer protocol.

In one embodiment, after receiving a partial segment of the pseudo header included in the second valid data DB disassembled by the data disassembling module 520c, the checksum calculating module 520d begins to calculate the pseudo header checksum. After the length of the second layer protocol segment is received, the calculation of the pseudo header checksum is completed.

In one embodiment, after receiving the control signal IS sent by the checksum controlling module 520b, the checksum calculating module 520d begins to calculate the checksum of the second layer protocol (TCP/UDP) segment. Specifically, the control signal IS is used to trigger the checksum calculating module 520d to begin performing calculation on the data in the second layer protocol segment disassembled by the data disassembling module 520c to calculate the checksum of the second layer protocol (TCP/UDP) segment. In one embodiment, after calculating the checksum of the second layer protocol (TCP/UDP) segment, the checksum calculating module 520*d* accumulates the checksum of the second layer protocol (TCP/UDP) segment and the obtained pseudo header checksum to calculate the final checksum.

Figure 6:
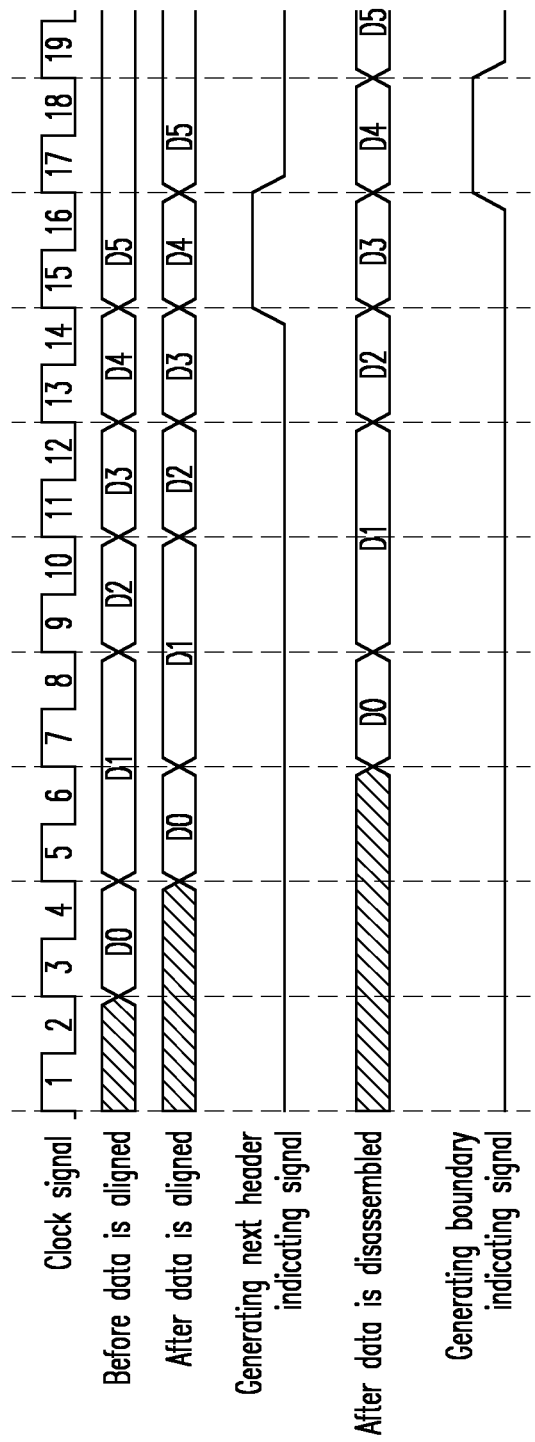
FIG. 6 is a timing diagram illustrated according to FIG. 5A and FIG. 5B.

Referring to FIG. 6, FIG. 6 is a timing diagram illustrated according to FIG. 5A and FIG. 5B. In FIG. 6, assuming that data D0, D1, D2, D3 and D4 are different data in the IP (first layer protocol) segment in the "IPV6+TCP" packet, and the data followed by D4 (i.e., data D5 shown in FIG. 6) belong to TCP (second layer protocol) segment. As compared with FIG. 4, under the same condition, the control information IS, of the data shown in FIG. 6, is generated at the eighteenth clock (i.e., ninth cycle). That is, the embodiment of the disclosure simplifies the logic of the overall data path and shortens data delay prior to calculation of checksum. Specifically, the embodiment of FIG. 6 is shortened by three cycles as compared with the embodiment of FIG. 4.

In the meantime, since the data path is shortened, and the data bit width is 64, the embodiment of the disclosure saves 192 (i.e., 64×3) D-type flip-flops, and also simplifies related controlling logic, thus, the overall power consumption and area of NIC circuit are reduced to some extent.

Figure 7:
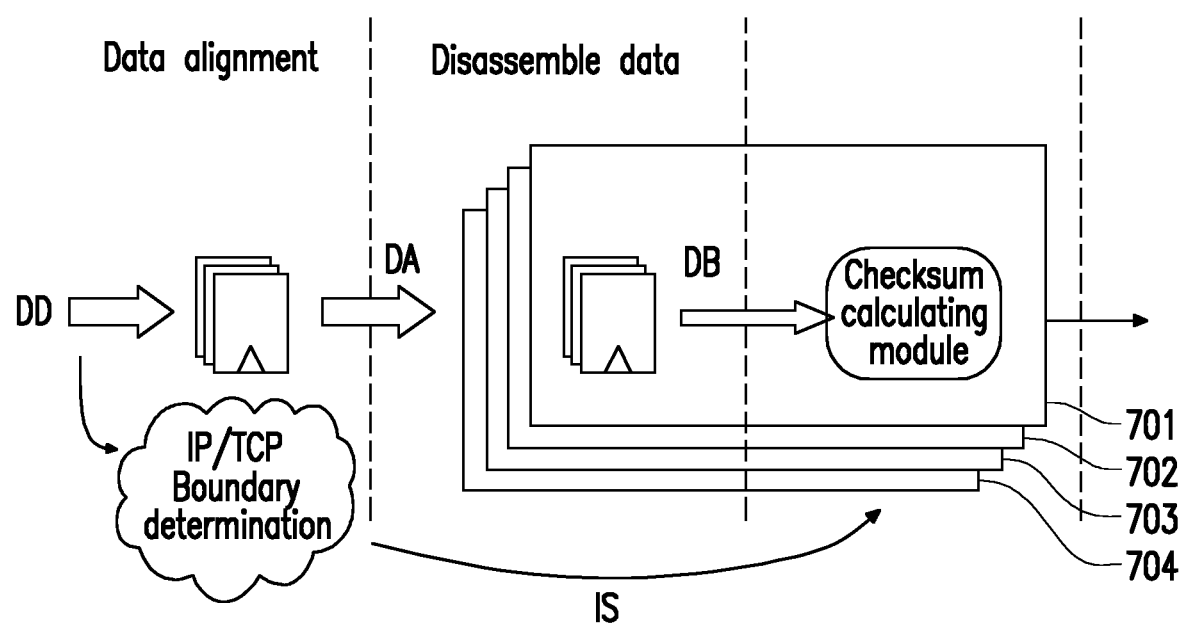
FIG. 7 is a schematic view of checksum calculating mechanism according to FIG. 5B.

In other embodiments, one NIC may simultaneously include a plurality of TX, and the data alignment module and/or checksum module may be integrated on the TX. In one embodiment, the plurality of TX may share one module that can perform boundary determination operation and/or one module that can perform data alignment operation for saving circuit. As shown in FIG. 7, the NIC may simultaneously include four TX 701, 702, 703 and 704, wherein each of the TX includes one checksum controlling module 520*b*, one data disassembling module 520*c* and one checksum calculating module 520*d*.

Referring to FIG. 7, FIG. 7 is a schematic view of checksum calculating mechanism according to FIG. 5B. In one embodiment, the NIC includes four TX 701, 702, 703 and 704, which are exemplarily represented by four overlapped rectangular boxes in FIG. 7, and the meaning of the labels in FIG. 7 is the same as those in FIG. 5B. As shown in FIG. 7, the four TX 701, 702, 703 and 704 may share the same module that can perform boundary determination operation (e.g., boundary determination module 530 shown in FIG. 5A) and the same module that can perform data alignment operation (e.g., data alignment module 510 shown in FIG. 5A). For example, when TX 701 performs checksum calculation on one packet according to the packet aligned by the data alignment module 510 and the control information IS corresponding to the packet provided by the boundary determination module 530, if the data alignment module 510 and/or the boundary determination module 530 begin to receive the raw data of another packet, the result of boundary determination operation and data alignment operation performed on the raw data of another packet is transmitted to another TX (e.g., TX 703) for subsequent operation for generating the checksum corresponding to another packet. In other words, the plurality of TX may include a plurality of data disassembling modules configured to respectively perform data disassembling operation on the plurality of first valid data to generate a plurality of second valid data. The plurality of checksum controlling modules are configured to respectively receive a plurality of boundary information corresponding to a plurality of raw data. The plurality of checksum calculating modules are configured to respectively calculate a plurality of checksum according to the plurality of boundary information and the plurality of second valid data. Specifically, the data disassembling modules and the checksum controlling modules may be integrated in one module, which may be the data disassembling module shown in FIG. 7. In other words, the NIC of the disclosure does not need to place one set of modules for performing boundary determination operation and/or a module for performing data alignment operation in every TX, thus, the effect of saving circuit area and cost may be achieved.

In summary, the network interface controller provided in the disclosure may perform boundary determination operation in advance according to raw data (including invalid data) to generate control information, without waiting for the first valid data to be disassembled as the second valid data to perform the boundary determination operation according to the second valid data, thus, shortens the time required for calculating checksum and improves efficiency. Additionally, when calculating the checksum, the pseudo header checksum may be calculated firstly, and the calculation result is stored temporarily. After completing the calculation of the checksum of the second layer protocol (TCP/UDP) segment, the final checksum is calculated according to the pseudo header checksum and the checksum of the second layer protocol (TCP/UDP) segment, instead of that the checksum of the second layer protocol (TCP/UDP) segment is calculated firstly and the checksum of the pseudo header and the second layer protocol (TCP/UDP) are accumulated to calculate the final checksum. In this invention, the time point for calculating checksum is advanced, and the checksum is obtained earlier. Moreover, while the time required for calculating checksum is shortened, the number of required hardware (e.g., D-type flip-flops) can be reduced as well, thus, simplifying related controlling logic and reducing the overall power consumption and area of circuit. Additionally, when a plurality of TX are simultaneously present in the NIC, since these TX can share the same module, which can perform boundary determination operation and/or data alignment operation, thus, the effect of saving circuit area and cost may be achieved.

Although the disclosure has been disclosed by the above embodiments, the embodiments are not intended to limit the disclosure. It will be apparent to those skilled in the art that various modifications and variations can be made to the structure of the disclosure without departing from the scope or spirit of the disclosure. Therefore, the protecting range of the disclosure falls in the appended claims.

What is claimed is:

1. A network interface controller, comprising:
    a data alignment circuit, receiving at least one raw data comprising valid data and invalid data, and re-combining all of the valid data in the raw data as a first valid data, wherein the raw data comprises a first layer protocol segment and a second layer protocol segment;
    a boundary determination circuit, receiving the raw data in parallel to the data alignment circuit and performing a boundary determination operation according to the raw data to generate a boundary information, wherein the boundary information is used to determine a boundary between the first layer protocol segment and the second layer protocol segment; and
    a checksum circuit, coupled to the data alignment circuit and configured to:
        disassemble the first valid data as at least two second valid data, wherein a length of each of the second valid data is smaller than a length of the first valid data; and
        calculate a checksum of a second layer protocol according to the boundary information and the second valid data.

2. The network interface controller according to claim 1, wherein the checksum circuit further comprises:
   a checksum controlling circuit, configured to receive the boundary information, and generating a control information according to the boundary information, wherein the control information comprises a control signal and a length of the second layer protocol segment; and
   a checksum calculating circuit, configured to calculate the checksum of the second layer protocol according to the control signal, the length of the second layer protocol segment and the second valid data.

3. The network interface controller according to claim 2, wherein the checksum calculating circuit calculates the checksum of the second layer protocol according to the second valid data based on a unit of two bytes.

4. The network interface controller according to claim 2, wherein the checksum circuit further comprises:
   a data disassembling circuit, configured to receive the first valid data, disassemble the first valid data as the second valid data, and generate a counting information in the process of disassembling data, wherein the counting information is used to indicate the beginning of the second valid data.

5. The network interface controller according to claim 4, wherein the checksum controlling circuit and the data disassembling circuit are integrated in a same hardware circuit.

6. The network interface controller according to claim 4, wherein the checksum controlling circuit generates the control signal according to the boundary information after receiving the counting information, wherein the control signal indicates that the second valid data reaches the boundary between the first layer protocol segment and the second layer protocol segment.

7. The network interface controller according to claim 1, wherein the checksum circuit further comprises a plurality of data disassembling circuits, a plurality of checksum controlling circuits and a plurality of checksum calculating circuits, wherein:
   the plurality of data disassembling circuits respectively perform data disassembling operation on the plurality of first valid data to generate the plurality of second valid data;
   the plurality of checksum controlling circuits respectively receive the plurality of boundary information corresponding to the plurality of raw data; and
   the plurality of checksum calculating circuits respectively calculate the plurality of checksums according to the plurality of boundary information and the plurality of second valid data.

8. The network interface controller according to claim 2, wherein the checksum calculating circuit is further configured to:
   calculate a checksum of a pseudo header;
   calculate a checksum of the second layer protocol segment according to the control signal; and
   calculate the checksum of the second layer protocol according to the checksum of the pseudo header and the checksum of the second layer protocol segment.

9. The network interface controller according to claim 8, wherein the pseudo header comprises a source address segment of the first layer protocol, a destination address segment of the first layer protocol and the length of the second layer protocol segment.

10. The network interface controller according to claim 8, wherein the checksum calculating circuit begins calculating the checksum of the second layer protocol segment after receiving the control signal, and completes calculation of the checksum of the pseudo header after receiving the length of the second layer protocol segment.

11. The network interface controller according to claim 8, wherein the checksum calculating circuit further comprises a register used to temporarily store the checksum of the pseudo header.

12. The network interface controller according to claim 1, wherein the boundary determination circuit removes an invalid data included in the raw data to generate a third valid data, and determines information of the first layer protocol segment and information of the second layer protocol segment in the raw data according to the third valid data; and
   generates the boundary information according to the information of the first layer protocol segment and the information of the second layer protocol segment.

13. The network interface controller according to claim 1, wherein the boundary determination circuit is embedded in the checksum circuit.

14. The network interface controller according to claim 1, wherein the second layer protocol segment is comprised in a payload of the first layer protocol segment, the first layer protocol is a network layer protocol comprising an Internet protocol, the second layer protocol is a transport layer protocol comprising a transmission control protocol and a user datagram protocol.

15. The network interface controller according to claim 1, wherein the boundary determination circuit determines type of the second layer protocol according to a next header in the raw data.

16. The network interface controller according to claim 1, wherein the boundary determination circuit generates the boundary information according to at least one next header in the raw data, wherein the next header comprises information indicating whether there is extension header in the raw data, if the raw data comprises at least one extension header, the boundary information further comprises type of respective extension header and length information of respective extension header.

17. The network interface controller according to claim 1, wherein the network interface controller is embedded in a chipset.

18. The network interface controller according to claim 1, wherein the network interface controller is a gigabit network interface card.

19. The network interface controller according to claim 1, wherein a length of the raw data is 64 bits, a length of the first valid data is 64 bits, and a length of the second valid data is 16 bits.

20. The network interface controller according to claim 1, wherein the network interface controller further comprises at least one transmitter, after the checksum circuit fills the checksum of the second layer protocol into a data packet, the data packet is transmitted through the transmitter.

* * * * *